US009765172B2

(12) United States Patent
Pottie et al.

(10) Patent No.: US 9,765,172 B2
(45) Date of Patent: Sep. 19, 2017

(54) PROCESS FOR PREPARING POLYOXYMETHYLENE

(71) Applicant: BASF SE, Ludwigshafen (DE)

(72) Inventors: Laurence Pottie, Cologne (DE); Juergen Demeter, Frankenthal (DE); Marie-Claire Hermant, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/894,158

(22) PCT Filed: May 26, 2014

(86) PCT No.: PCT/EP2014/060815
§ 371 (c)(1),
(2) Date: Nov. 25, 2015

(87) PCT Pub. No.: WO2014/191348
PCT Pub. Date: Dec. 4, 2014

(65) Prior Publication Data
US 2016/0115270 A1 Apr. 28, 2016

(30) Foreign Application Priority Data
May 29, 2013 (EP) .................................... 13169687

(51) Int. Cl.
C08G 2/08 (2006.01)
C08G 65/00 (2006.01)
C08G 59/02 (2006.01)
C08G 2/10 (2006.01)
C08G 2/06 (2006.01)
C08G 2/18 (2006.01)
C08G 2/22 (2006.01)
C08G 4/00 (2006.01)
C08L 59/04 (2006.01)

(52) U.S. Cl.
CPC ............... C08G 2/08 (2013.01); C08G 2/06 (2013.01); C08G 2/10 (2013.01); C08G 2/18 (2013.01); C08G 2/22 (2013.01); C08G 4/00 (2013.01); C08G 59/02 (2013.01); C08G 65/00 (2013.01); C08L 59/04 (2013.01)

(58) Field of Classification Search
CPC ....................................................... C08G 2/08

USPC ................................ 528/232, 270, 249, 250
See application file for complete search history.

(56) References Cited

U.S. PATENT DOCUMENTS

| 3,413,269 A | 11/1968 | Ishida et al. |
| 3,420,797 A | 1/1969 | Ishida et al. |
| 3,598,788 A | 8/1971 | Burg |
| 3,775,370 A | 11/1973 | Sander |
| 4,412,067 A | 10/1983 | Amann et al. |
| 7,906,609 B2 | 3/2011 | Blinzler et al. |
| 8,859,721 B2 | 10/2014 | Deininger et al. |
| 2013/0131255 A1 | 5/2013 | Pottie et al. |
| 2013/0203921 A1 | 8/2013 | Pottie et al. |
| 2013/0203958 A1 | 8/2013 | Pottie et al. |
| 2014/0243477 A1 | 8/2014 | Pottie et al. |

FOREIGN PATENT DOCUMENTS

| DE | 1 720 780 | 7/1971 |
| DE | 2038908 | 2/1972 |
| EP | 2 546 272 A1 | 1/2013 |
| GB | 1088435 | 10/1967 |
| JP | 2012-111830 A | 6/2012 |
| WO | WO 2007/009925 A1 | 1/2007 |
| WO | 2014/170242 A1 | 10/2014 |
| WO | WO 2014/170241 A1 | 10/2014 |
| WO | WO 2015/091091 A1 | 6/2015 |
| WO | WO 2015/124557 A1 | 8/2015 |

OTHER PUBLICATIONS

International Search Report issued Aug. 14, 2014 in PCT/EP2014/060815 (with English language translation).
International Preliminary Report on Patentability issued Dec. 3, 2015 in PCT/EP2014/060815 (submitting English translation only).

Primary Examiner — Duc Truong
(74) Attorney, Agent, or Firm — Oblon, McClelland, Maier & Neustadt, L.L.P.

(57) ABSTRACT

The patent application relates to a process for preparing polyoxymethylene by polymerization of a reaction mixture ($R_G$) which comprises at least one formaldehyde source and at least one initiator mixture ($I_G$), wherein the initiator mixture ($I_G$) comprises at least one polymerization initiator and at least one solvent of the general formula (I)

$$R^1-O-[-R^3-O-]_m-R^2 \quad (I),$$

where
m is 1, 2, 3 or 4;
$R^1$ and $R^2$ are each, independently of one another, $C_3$-$C_6$-alkyl;
$R^3$ is $C_1$-$C_5$-alkylene.

18 Claims, No Drawings

PROCESS FOR PREPARING POLYOXYMETHYLENE

The present invention relates to a process for preparing polyoxymethylene by polymerization of a reaction mixture ($R_G$) which comprises at least one formaldehyde source and at least one initiator mixture ($I_G$), wherein the initiator mixture ($I_G$) comprises at least one polymerization initiator and at least one solvent (I). Furthermore, the invention relates to the use of the solvent (I) and to polyoxymethylene which is obtainable by the process of the invention.

Processes for preparing polymers based on polyoxymethylene are known in principle from the prior art. Thus, DE 20 38 908 describes a process for preparing oxymethylene polymers, in which trioxane and cyclic and/or linear formal comonomers are polymerized using a polymerization catalyst combination. This comprises a perchloric ester/anhydride and dimethyl or diethyl ethers of glycols. It was shown that the catalyst concentration can be reduced when dimethyl or diethyl ethers of glycols are used as solvent for the catalyst. As a result, high reaction yields and improved thermal stability of the polymers obtained are observed.

In general, solvents are necessary in polymerization processes employed for the preparation of polyoxymethylene in order to dissolve the initiator and/or the deactivator for the polymerization reaction. In this way, small amounts of initiator can also be added in a defined manner to the reaction mixture. A requirement which the solvent has to meet is a boiling point of more than 100° C., so that this is above the reaction temperature of the polymerization reaction. If no solvent is used, it is difficult to meter the small amounts required of the initiator precisely and/or distribute them uniformly in the reaction mixture.

On the other hand, the use of solvents results in the problem of separating these off from the reaction so that they are not present, or present in only small amounts, in the finished polyoxymethylene polymer. Otherwise, solvents and other additives can accumulate in the recirculation of residual monomers which have been separated off and can thus interfere in the polymerization process or else remain completely or at least in residual amounts in the finished polymer. The molding produced from the polyoxymethylene polymer can be adversely affected by the remaining residual amounts of solvent as a result of migration, sweating out/ evaporation or coating formation.

For this purpose, DE 1 720 780 proposes adding boron trifluoride dissolved in a cyclic formal such as 1,3-dioxolane, which is at the same time the comonomer, as initiator in the preparation of trioxane copolymers.

Furthermore, U.S. Pat. No. 3,598,788 describes a process for preparing copolymers of trioxane, in which perchloric acid dissolved in glycol dimethyl ethers and solvents based on cyclic 1,4-dioxane is used. Specifically, U.S. Pat. No. 3,598,788 describes a process for the production of copolymers of trioxane via copolymerization of trioxane with cyclic acetals, linear formals, polyethylene oxides, or prepolymers of polyhydric alcohols, and formaldehyde, in the presence of aqueous perchloric acid as cationic initiator. The use of nonaqueous perchloric acid as initiator leads to polymers with high molecular weight in good yields, even when initiator concentrations are low. The perchloric acid must be added in very small amounts, and a solvent is therefore required here that is selected from aliphatic or cyclic ethers, for example from monoethylene glycol dimethyl ether, diethylene glycol dimethyl ether, 1,4-dioxane, or tetrahydrofuran. 1,4-Dioxane and diethylene glycol dimethyl ether are particularly suitable as solvents for the perchloric acid. The use of other dialkyl ethers is not described.

U.S. Pat. No. 3,413,269 discloses a process for the production of high-molecular-weight polyoxymethylene in which ionizing or ultraviolet radiation is used in a closed system to irradiate paraformaldehyde, in order to produce a modified polyoxymethylene with higher molecular weight, which is pyrolyzed to form formaldehyde, which in turn is polymerized to give a polyoxymethylene with high molecular weight. Commercial paraformaldehyde with maximum purity is used as starting material, which can be dried by vacuum drying or by washing with dry hydrophilic organic solvents. The solvents include, as sole dialkyl ether, diethylene glycol dimethyl ether, and no other dialkyl ethers of this generic type are mentioned. The use of the diethylene glycol dimethyl ether is moreover restricted to the washing of the paraformaldehyde, rather than the dilution of a cationic initiator.

U.S. Pat. No. 4,412,067 describes a process for the continuous polymerization or copolymerization of trioxane, where the trioxane as homo- or copolymer is produced through continuous introduction of the liquid starting material in a mixer in which a pulverized or granular oxymethylene homopolymer or copolymer is present. Starting material for this process comprises either molten trioxane alone or a molten mixture of trioxane and of at least one compound copolymerizable with trioxane. Examples of such compounds are cyclic ethers having from 3 to 5 rings, preferably 3 rings, cyclic acetals other than trioxane, or linear polyacetals. These compounds are added in amounts of from 0.01 to 20% by weight, based on the trioxane. Examples mentioned for glycidyl ethers are inter alia the diglycidyl ether of diethylene glycol. Again, U.S. Pat. No. 4,412,067 specifies no dialkyl ethers other than diglycidyl ether of diethylene glycol.

The diglycidyl ether of diethylene glycol is moreover added here as copolymerizable compound rather than as solvent for a cationic initiator.

GB 1,088,435 discloses a process for the production of high-purity formaldehyde. Specifically, low-molecular-weight polyoxymethylene is further polymerized by heating in a closed system at a temperature of 80° C. to 165° C., and the resultant increased-molecular-weight polyoxymethylene is dried in order to reduce the content of absorbed water, and then the dried polyoxymethylene is decomposed to produce high-purity formaldehyde. It is moreover possible to use a liquid medium in the process as solvent for the starting material polyoxymethylene, or the polyoxymethylene that has already been treated. Examples specified for such media are inter alia diethylene glycol dimethyl ether. This large number of possible media serves as heat-transfer material for the reaction and as a solvent or dispersion medium for water which is liberated during the reaction, or as carrier medium for transport. Said document does not reveal that dialkyl ethers other than the diethylene glycol dimethyl ether described are used, and in particular does not reveal use of these as solvents for a cationic initiator.

U.S. Pat. No. 3,420,797 describes a process for the production of polyoxymethylenes with high molecular weights in which paraformaldehyde is heated in a closed system in the presence of a sulfoxy catalyst in order to produce a modified polyoxymethylene with higher molecular weight, which is decomposed for the production of formaldehyde, which in turn is polymerized to obtain a polyoxymethylene with high molecular weight and high thermal stability. The starting material used here comprises commercial formaldehyde with maximum purity. The formaldehyde/paraformaldehyde can be dried in vacuo or by washing with a dry, hydrophilic organic solvent. Among said solvents is diethylene glycol dimethyl ether. U.S. Pat. No. 3,420,797 gives no indication of other dialkyl ethers or the use as solvent for a cationic initiator.

However, the prior art makes no reference to the migration of the solvents used for the initiator from the polymeric end products. It is important here that a critical level of migration is below 10 µg/kg for each initiator solvent.

It is consequently an object of the present invention to overcome the disadvantages of the prior art. In particular, it is an object to provide an improved process for preparing polyoxymethylene, by means of which it is possible to obtain polyoxymethylene which has a significantly reduced degree of migration of the initiator solvent.

This object is achieved by a process for preparing polyoxymethylene by polymerization of a reaction mixture ($R_G$) which comprises at least one formaldehyde source and at least one initiator mixture ($I_G$), wherein the initiator mixture ($I_G$) comprises at least one polymerization initiator and at least one solvent of the general formula (I)

$$R^1 \!-\! O \!-\! [\!-\! R^3 \!-\! O \!-\!]_m \!-\! R^2 \qquad (I),$$

where m is 1, 2, 3 or 4;

$R^1$ and $R^2$ are each, independently of one another, $C_3$-$C_6$-alkyl;

$R^3$ is $C_1$-$C_5$-alkylene.

For the present purposes, the term "polyoxymethylene" encompasses both polyoxymethylene itself and also polyoxymethylene copolymers and polyoxymethylene terpolymers.

Polyoxymethylene copolymers (POM) are known per se and are commercially available. They are usually prepared by polymerization of trioxane as main monomer; in addition, comonomers are concomitantly used. The main monomers are preferably selected from among trioxane and other cyclic or linear formals or other formaldehyde sources.

The expression "main monomers" is intended to indicate that the proportion of these monomers in the total amount of monomers, i.e. the sum of main monomers and comonomers, is greater than the proportion of the comonomers in the total amount of monomers.

The term "formaldehyde source" relates to substances which can liberate formaldehyde under the reaction conditions of the preparation of polyoxymethylene.

It has surprisingly been discovered that polyoxymethylene polymers in which the degree of migration of the solvent for the polymerization initiator is below 10 µg/kg, preferably below 6 µg/kg, can be prepared by the process of the invention.

The formaldehyde sources are advantageously selected from the group of cyclic or linear formals, in particular from the group consisting of formaldehyde and 1,3,5-trioxane. 1,3,5-Trioxane is particularly preferred.

Preference is given to solvents of the general formula (I) in which m is 1, 2, 3 or 4;

$R^1$ and $R^2$ are each, independently of one another, unsubstituted $C_3$-$C_6$-alkyl; and $R^3$ is unsubstituted $C_1$-$C_5$-alkylene.

In the general formula (I), $R^1$ and $R^2$ are preferably identical. In the general formula (I), $R^1$, $R^2$ and $R^3$ are preferably unsubstituted.

The present invention thus also provides a process in which a solvent of the general formula (I) in which m is 1, 2, 3 or 4;

$R^1$ and $R^2$ are both unsubstituted $C_3$-$C_6$-alkyl;

$R^3$ is unsubstituted $C_1$-$C_5$-alkylene is used in the process according to claim 1 or 2.

In the general formula (I), m is preferably 1, 2 or 3, particularly preferably 2.

In the general formula (I), $R^3$ is particularly preferably ethylene ($-CH_2CH_2-$).

In a preferred embodiment of the process of the invention, m=2, $R^1$ and $R^2$ are both, i.e. identically, unsubstituted $C_3$-$C_6$-alkyl and $R^3$ is ethylene in the general formula (I).

As solvent (I), preference is given to solvents selected from the group consisting of diethylene glycol dipropyl ether, diethylene glycol dibutyl ether, diethylene glycol dipentyl ether and diethylene glycol dihexyl ether.

For the present purposes, the terms propyl, butyl, pentyl and hexyl encompass both the linear alkyl radicals and the branched alkyl radicals. Preference is given to the linear radicals n-propyl, n-butyl, n-pentyl and n-hexyl.

Particular preference is given to diethylene glycol dibutyl ether as solvent (I).

When the solvents (I) according to the invention are used, it is possible to achieve degrees of migration in the finished polyoxymethylene polymer which are below the detection limit of 6.0 µg/kg.

The degree of migration is determined as follows:

Plates were injection-molded from the polymer obtainable by the process of the invention. The tests were carried out using injection-molded plates having dimensions of 2.5 cm×2.5 cm×2 mm. The migration contact was carried out in accordance with the European standard EN 1186-3 and EN 1186-2 for ethanol solutions and olive oil. The data from the third contact study are reported in table 1 below.

The polyoxymethylene polymers which can be obtained according to the invention can comprise comonomers. Quite generally, such POM polymers have at least 50 mol % of repeating units $-CH_2O-$ in the main polymer chain. Suitable polyoxymethylene copolymers are, in particular, those which comprise the repeating units $-CH_2O-$ and also up to 50 mol %, preferably from 0.01 to 20 mol %, in particular from 0.1 to 10 mol % and very particularly preferably from 0.5 to 6 mol %, of repeating units of the formula (IIa)

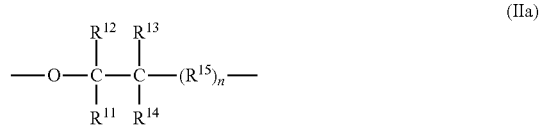

(IIa)

where $R^{11}$ to $R^{15}$ have the meanings indicated below for the general formula (II). These groups can advantageously be introduced into the polyoxymethylene copolymers by ring opening of cyclic ethers. Preference is given to the comonomers (C-1).

In a preferred embodiment of the process, the reaction mixture ($R_G$) further comprises at least one first comonomer (C-1).

The comonomer (C-1) is preferably selected from the group of cyclic ethers of the general formula (II)

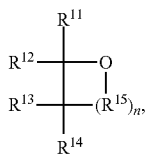

(II)

where
R$^{11}$ to R$^{14}$ are each, independently of one another, H, C$_1$-C$_4$-alkyl or halogen-substituted C$_1$-C$_4$-alkyl;
R$^{15}$ is a chemical bond, a (—CR$^{15a}$R$^{15b}$—) group or a (—CR$^{15a}$R$^{15b}$O—) group, where R$^{15a}$ and R$^{15b}$ are each, independently of one another, H, unsubstituted or at least monosubstituted C$_1$-C$_4$-alkyl, where the substituents are selected from among F, Cl, Br, OH and C$_1$-C$_4$-alkyl;
n is 0, 1, 2 or 3.

If n is 0, then R$^{15}$ is a chemical bond between the adjacent carbon atom and the oxygen atom. If R$^{15}$ is a (—CR$^{15a}$R$^{15b}$—) group, then the oxygen atom (O) of the group is bound to another carbon atom (C) of formula (II) and not to the oxygen atom (O) of formula (II). In other words, formula (II) does not comprise peroxide compounds.

For the purposes of the present invention, the expression halogen-substituted refers to radicals which bear 1 or more substituents from the group consisting of F (fluorine), Cl (chlorine) and Br (bromine).

It has been found to be advantageous for the reaction mixture (R$_G$) to comprise, based on the formaldehyde source, up to 50 mol %, in particular from 0.01 mol % to 20 mol %, of the comonomer (C-1).

As comonomers (C-1), mention may be made, purely by way of example, of ethylene oxide, 1,2-propylene oxide, 1,2-butylene oxide, 1,3-butylene oxide, 1,3-dioxane, 1,3-dioxolane and 1,3-dioxepane (=butanediol formal, BUFO) and also linear oligo formals or polyformals such as polydioxolane or polydioxepane. 1,3-Dioxolane is a particularly preferred comonomer (C-1).

As polymerization initiator, preference is given to using a protic acid, in particular a fluorinated or chlorinated alkylsulfonic or arylsulfonic acid or a Lewis acid. These cationic initiators have been found to be particularly useful for the polymerization reactions of the abovementioned formaldehyde sources. Preferred examples are perchloric acid, trifluoromethanesulfonic acid or Lewis acids, for example tin tetrachloride, arsenic pentafluoride, phosphorus pentafluoride and boron trifluoride and likewise their complexes and compounds of a salt type, for example boron trifluoride etherate and triphenylmethylene hexafluorophosphate.

To initiate the polymerization reaction reliably, the polymerization initiator should be added in an amount of from 0.0001 ppm to 1000 ppm, in particular from 0.001 ppm to 100 ppm, based on the reaction mixture (R$_G$). Smaller amounts can lead to retardation of the polymerization reaction, while larger amounts do not accelerate the reaction but can lead to undesirable by-products and have to be separated off at the end of the reaction.

To ensure that the abovementioned, sometimes very small amounts of polymerization initiator can be metered precisely into the reaction mixture (R$_G$) and subsequently be homogeneously distributed therein, it is advantageous to dissolve the polymerization initiator in the solvent in a concentration of from 0.005% by weight to 5% by weight.

In a preferred embodiment, the reaction mixture (R$_G$) further comprises at least one chain transfer agent in order to set the molecular weights of the polymers. In particular, a monohydric alcohol or an acetal or formal of a monohydric alcohol is used for this purpose. Particularly preferred chain transfer agents are methylal and butylal.

The chain transfer agent is preferably added in an amount of from 10 ppm to 10 000 ppm, in particular from 100 ppm to 3000 ppm, based on the reaction mixture (R$_G$). A smaller amount has been found to be insufficient for precise setting of the molecular weight, while only low molecular weight polymers can normally be obtained when using greater amounts.

Polyoxymethylene polymers which can be obtained by reaction of a formaldehyde source together with the first comonomer (C-1) and a second comonomer (C-2) are likewise suitable.

In a variant according to the invention of the present invention, the reaction mixture (R$_G$) further comprises at least one second comonomer (C-2), in particular a bifunctional compound of the general formula (III) or (IV)

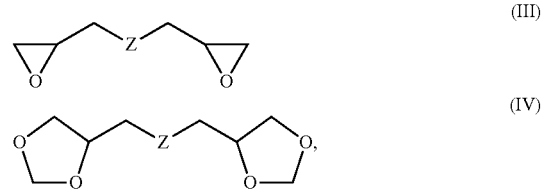

where
Z is a chemical bond, an (—O—) group or an (—O—R$^{21}$—O—) group, where R$^{21}$ is unsubstituted C$_1$-C$_8$-alkylene or C$_3$-C$_8$-cycloalkylene.

The addition of the second comonomer (C-2) makes it possible to prepare, in particular, oxymethylene terpolymers. Preferred examples of the second comonomer (C-2) are ethylene diglycide, diglycidyl ether and diethers prepared from glycidyl compounds and formaldehyde, dioxane or trioxane in a molar ratio of 2:1, and likewise diethers prepared from 2 mol of a glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol and 1,4-cyclohexanediol.

In a second aspect, the present invention provides for the use of a solvent of the general formula (I)

where
m is 1, 2, 3 or 4;
R$^1$ and R$^2$ are each, independently of one another, C$_3$-C$_6$-alkyl;
R$^3$ is C$_1$-C$_5$-alkylene,
as solvent for at least one polymerization initiator in the preparation of polyoxymethylene.

For the use according to the invention, the information and preferences given above in respect of the process apply analogously.

As stated above, it is possible to achieve a degree of migration of the solvent for the polymerization initiator in the finished polyoxymethylene polymer below 10 μg/kg, preferably below 6 μg/kg, by the use of this specific solvent.

A particularly preferred solvent is diethylene glycol dibutyl ether, in particular diethylene glycol di-n-butyl ether, which leads to degrees of migration in the finished polyoxymethylene polymer which are below the detection limit of 6.0 μg/kg.

The above-defined object is, in a third aspect of the present invention, achieved by a polyoxymethylene which is obtainable by the above-described process according to the invention.

The present invention thus also provides a polyoxymethylene which is obtainable by the process of the invention.

This polyoxymethylene preferably has a degree of migration of the solvent for the polymerization initiator of less than 10 µg/kg, in particular less than 6 µg/kg.

The polyoxymethylene obtainable by the process of the invention can comprise further customary additives as described, for example, in WO 2007/009925.

Further features, advantages and possible uses can be seen from the following description of preferred examples which do not, however, restrict the invention. Here, all features described are on their own or in any combination subject matter of the invention, also independently of the summary thereof in the claims or their back-references.

COMPARATIVE EXAMPLE C1

A batch bulk polymerization of the comonomers 1,3,5-trioxane and 1,3-dioxepane was carried out under nitrogen at 80° C. on an industrial scale of 1000 kg/h. 5 kg of a mixture of 1,3,5-trioxane/1,3-dioxepane/di-n-butyl formal in a weight ratio of 97.13/2.7/0.17 were placed in a metal vessel. The reaction was initiated using 0.05 ppm of aqueous perchloric acid dissolved in triethylene glycol dimethyl ether.

The polymer product was transported directly to a mill and subsequently into a dryer. A buffer solution composed of 0.01% strength by weight sodium glycerophosphate and 0.05% by weight of sodium tetraborate was sprayed onto the milled polymer. A continuous warm stream of nitrogen (80° C.) was passed over the milled polymer while it moved through the dryer, so that remaining trioxane was removed. The total residence time of the polymer in the dryer was in the range from 3 to 6 hours. From these dryers, the polymer was introduced directly into an extruder where it was mixed with 0.35% by weight of Irganox® 245 FF (commercial product of Ciba Geigy), 0.15% by weight of glycerol distearate, 0.2% by weight of MFC (melamine-formaldehyde condensate). The resulting polymer was pelletized and dried further under warm nitrogen until the remaining formaldehyde level was below 100 ppm.

Analysis of the polymer finally obtained was carried out in order to determine the migration of any remaining initiator solvents. The tests were carried out using injection-molded plates having dimensions of 2.5 cm×2.5 cm×2 mm. The migration contact was carried out in accordance with the European standard EN 1186-3 and EN 1186-2 for ethanol solutions and olive oil. The data from the third contact study are shown in table 1 below.

COMPARATIVE EXAMPLE C2

This example was carried out essentially like comparative example 1 with the difference that the solvent used for the initiator was tetraethylene dimethyl ether.

EXAMPLE 3

This example was carried out essentially like comparative example 1 with the difference that the solvent used for the initiator was diethylene glycol dibutyl ether.

The studies of comparative examples C1 and C2 and of example 3 are shown in table 1.

TABLE 1

Migration details for remaining solvent from the polymer products

| Example | Solvent | 10% ethanol | 20% ethanol | 50% ethanol | Detection limit for ethanolic solutions | Olive oil | Detection limit for olive oil |
|---|---|---|---|---|---|---|---|
| C1 | Triethylene glycol dimethyl ether (µg/kg) | 12.6 | 14.4 | 19.8 | 5.4 | =DL* | 6.0 |
| C2 | Tetraethylene glycol dimethyl ether (µg/kg) | 36.6 | 41.4 | 45.6 | 6.6 | 24.6 | 6.6 |
| 3 | Diethylene glycol dibutyl ether (µg/kg) | <DL | <DL | <DL | 6.0 | <DL | 5.4 |

*DL: detection limit.

The migration of the solvents from the polymer materials finally obtained is significantly lower for the solvent according to the invention compared to the reference system of comparative examples C1 and C2.

The solvent used in example 3 according to the invention additionally has the advantage that it is toxicologically unproblematical. The polyoxymethylene obtained according to example 3 is therefore also suitable for food applications.

The invention claimed is:

1. A process for preparing polyoxymethylene, comprising polymerizing a reaction mixture ($R_G$) which comprises a formaldehyde source and an initiator mixture ($I_G$), wherein the initiator mixture ($I_G$) comprises a polymerization initiator and a solvent of formula (I):

$$R^1\text{—}O\text{—}[\text{—}R^3\text{—}O\text{—}]_m\text{—}R^2 \quad (I),$$

wherein m is 1, 2, 3 or 4;

$R^1$ and $R^2$ are each, independently of one another, $C_3$-$C_6$-alkyl; and $R^3$ is ethylene.

2. The process according to claim 1, wherein the formaldehyde source is selected from the group consisting of cyclic and linear formals.

3. The process according to claim 1, wherein m is 1, 2, 3 or 4; and $R^1$ and $R^2$ are both unsubstituted $C_3$-$C_6$-alkyl.

4. The process according to claim 1, wherein the reaction mixture ($R_G$) further comprises a first comonomer (C-1).

5. The process according to claim 4, wherein the comonomer (C-1) is a cyclic ether of formula (II):

wherein

R$^{11}$ to R$^{14}$ are each, independently of one another, H, C$_1$-C$_4$-alkyl or halogen-substituted C$_1$-C$_4$-alkyl;

R$^{15}$ is a chemical bond, a (—CR$^{15a}$R$^{15b}$—) group or a (—CR$^{15a}$R$^{15b}$O—) group, where R$^{15a}$ and R$^{15b}$ are each, independently of one another, H, unsubstituted or at least monosubstituted C$_1$-C$_4$-alkyl in which the substituents are selected from among F, Cl, Br, OH and C$_1$-C$_4$-alkyl; and n is 0, 1, 2 or 3.

6. The process according to claim 4, wherein the reaction mixture (R$_G$) comprises up to 50 mol %, based on the formaldehyde source, of the comonomer (C-1).

7. The process according to claim 1, wherein the polymerization initiator is a protic acid or a Lewis acid.

8. The process according to claim 1, wherein the polymerization initiator is added in an amount of from 0.0001 ppm to 1000 ppm, based on the reaction mixture (R$_G$).

9. The process according to claim 1, wherein the polymerization initiator is dissolved in the solvent (I) in a concentration of from 0.005% by weight to 5% by weight, based on a total weight of the initiator mixture (I$_G$).

10. The process according to claim 1, wherein the reaction mixture (R$_G$) further comprises a chain transfer agent.

11. The process according to claim 10, wherein the chain transfer agent is added in an amount of from 10 ppm to 10 000 ppm, based on the reaction mixture (R$_G$).

12. The process according to claim 1, wherein the reaction mixture (R$_G$) further comprises a second comonomer (C-2), which is a bifunctional compound of formula (III) or (IV):

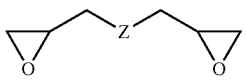
(III)

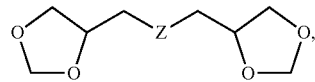
(IV)

wherein

Z is a chemical bond, an (—O—) group or an (—O—R$^{21}$—O—) group, where R$^{21}$ is unsubstituted C$_1$-C$_8$-alkylene or C$_3$-C$_8$-cycloalkylene.

13. The process of claim 1, further comprising dissolving the polymerization initiator in the solvent of formula (I) in a concentration of from 0.005% by weight to 5% by weight.

14. The process of claim 1, wherein solvent in the initiator mixture consists essentially of at least one solvent of formula (I).

15. The process of claim 1, wherein the solvent of formula (I) is diethylene glycol dipropyl ether, diethylene glycol dibutyl ether, diethylene glycol dipentyl ether, or diethylene glycol dihexyl ether, or any mixture thereof.

16. The process of claim 1, wherein the solvent of formula (I) is diethylene glycol dibutyl ether.

17. The process of claim 1, wherein R$^1$ and R$^2$ are each, independently of one another, linear C$_3$-C$_6$-alkyl.

18. A process for preparing polyoxymethylene, comprising polymerizing a reaction mixture (R$_G$) which comprises a formaldehyde source and an initiator mixture (I$_G$), wherein the initiator mixture (I$_G$) comprises a polymerization initiator and a solvent of formula (I):

$$R^1\text{—O—}[\text{—}R^3\text{—O—}]_m\text{—}R^2 \quad (I),$$

wherein m is 1, 2, 3 or 4;

R$^1$ and R$^2$ are each, independently of one another, C$_3$-C$_6$-alkyl; and

R$^3$ is ethylene, and wherein a degree of solvent migration is less than 10 μg/kg.

* * * * *